June 26, 1956
R. H. SWART ET AL
2,752,213
FABRICATED PISTON
Filed April 16, 1953
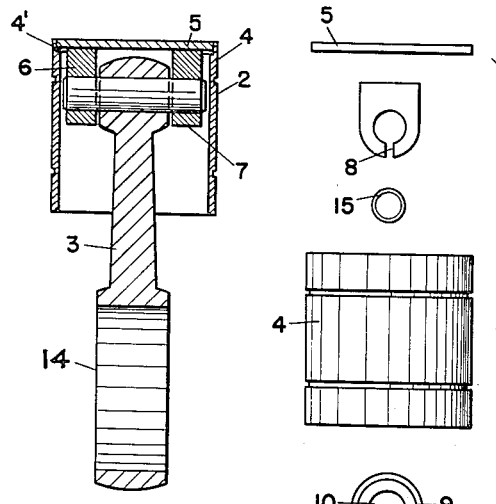
FIG. 1
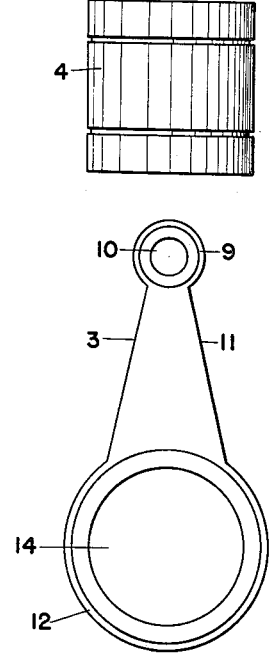
FIG. 2
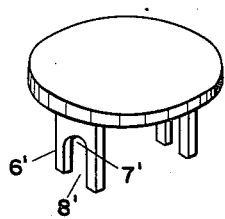
FIG. 3
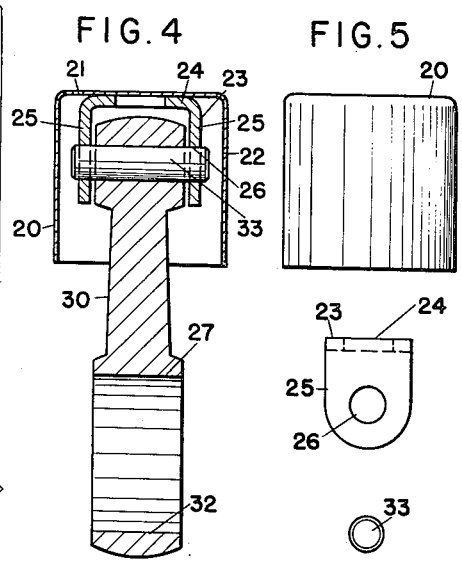
FIG. 4   FIG. 5
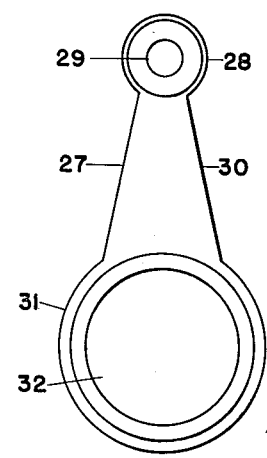
INVENTOR.
Richard H. Swart and
Robert W. Ayling
BY United States Patent Office 2,752,213
Patented June 26, 1956

2,752,213

FABRICATED PISTON

Richard H. Swart, Syracuse, and Robert W. Ayling, Utica, N. Y., assignors to Carrier Corporation, Syracuse, N. Y., a corporation of Delaware Application April 16, 1953, Serial No. 349,139

5 Claims. (Cl. 309—10)

This invention relates to a method of making a fabricated piston for use in reciprocating machinery such as a reciprocating refrigerant compressor and to a fabricated piston having an uninterrupted sealing surface.

Heretofore, pistons for use of reciprocating refrigerant compressors and similar devices have been cast and then machined to size with a cross hole in the piston wall to carry a wrist pin. This procedure is disadvantageous for the openings in the piston permit leakage from the compression space due to the relatively short distance between the openings and the top of the piston and are expensive to form. Likewise, the structure so formed is heavy, requiring excessive weight in the wall of the piston to provide adequate support for the attached eccentric strap. The interrupted surface of the piston may collect dust and dirt particles which may mar the interior surface of the cylinder interfering with a satisfactory seal or be collected and carried away by the refrigerant gas with resulting damage to other parts of the compressor and refrigeration system.

The chief object of the invention is to provide a readily fabricated piston having an uninterrupted sealing surface.

An object of the invention is to provide a light weight piston easily and readily assembled to assure accurate alignment between the parts thereof and the eccentric strap.

A further object is to provide a strong and durable, yet light weight piston in which the strap attaching wrist pin is placed closer to the head of the piston permitting a more satisfactory ratio of strap length to crank radius.

A still further object is to provide a method of making a fabricated piston. Other objects of our invention will be readily perceived from the following description.

This invention relates to a method for forming a fabricated piston which consists of the steps of attaching a strap to pin support means while the support means are without the skirt of the piston, inserting the support means carrying the strap within the skirt of the piston, and securing the support means in desired position within the skirt of the piston.

This invention also relates to a piston for a compressor including a hollow cylindrical piston body having an uninterrupted exterior surface, pin support means disposed inside the piston body and directly connected to the head of the piston body, an eccentric strap, and a wrist pin connecting the eccentric strap to the piston body, said pin support means being adapted to serve as bearings for the wrist pin that is disposed inside the piston body.

The attached drawing illustrates a preferred embodiment of our invention, in which Figure 1 is a view partly in section and partly in elevation of a fabricated piston attached to an eccentric strap;

Figure 2 is an exploded view of the elements of the piston;

Figure 3 is a perspective view of a modification of the pin support means of Figure 1;

Figure 4 is a sectional view of a modification of the invention; and

Figure 5 is an exploded view of the elements of the piston shown in Figure 4.

Referring to the drawing, and particularly Figure 1, there is shown a fabricated piston 2 attached to an eccentric strap 3. The piston 2 is fabricated, preferably, from tubing and stamped parts. Piston 2 includes a skirt 4 in the form of a cylinder and a head 5 provided with spaced pin bosses or lugs 6 extending downward from the head within the skirt 4. Skirt 4 is provided with a recess 4' in its wall in which the head nests. Openings 7 are provided in the pin bosses or lugs extending horizontally therein, the walls of the openings serving as bearings for a wrist pin, as hereinafter described.

The walls of the openings 7 in lugs 6 are slit as shown at 8 (Figure 2) in a vertical direction to permit clamping action on a wrist pin when it is disposed in the openings 7 to connect the piston to the strap. The strap 3 includes a head 9 having an opening 10 therein, a shank 11, and a lower portion 12 having an opening 14 therein through which the crank shaft extends.

To form the piston 2, head 5 is punched from a metal sheet. Lugs 6 are formed and attached to head 5 in any suitable manner, preferably by furnace brazing or projection welding. If desired, screws or rivets may be employed. Lugs 6 are employed to support the wrist pin permitting attachment of the strap 3 to piston 2.

After the lugs 6 have been attached to the head, the openings 7 are formed therein in order to assure accurate alignment of the openings. These openings 7 are then provided with slits 8 to permit clamping action on a wrist pin.

The tubular skirt 4 is then placed over the shank 11 of strap 3. The head 9 of strap 3 is placed in the space between lugs 6 and a wrist pin 15 is forced within the aligned openings in the strap shank and lugs 6 to secure the strap to head 5. The assembly is then placed in a jig designed to obtain accurate alignment between the cylindrical piston skirt and the opening 14 of the eccentric strap. The jig also sets the distance and the alignment of the piston head 5 from the center line of the opening 14 of strap 3.

Head 5 is then joined to the tubular skirt 4 nesting in the recess 4' therein to form the piston. Preferably, the head is induction brazed to the skirt. It will be understood that other suitable means may be employed.

A modification of the lugs of Figure 1 is shown in Figure 3. In this embodiment, the slits 8' in the lugs 6' are made large enough to permit insertion of a wrist pin into the openings 7' by means of the slits 8'. Preferably, these lugs are made of flexible material. The piston is assembled in the same manner as Figure 1 except that a wrist pin is attached to an eccentric strap before it is inserted in the openings 7' through the slits 8'. After insertion in the openings 7', the wrist pin is held in position in the openings by welding or soldering the slits.

In Figures 4 and 5 there is illustrated a modification of the invention in which the piston includes an integral body 20 having a head 21 and a skirt 22. Preferably, body 20 is formed by a suitable drawing operation. The pin support means comprises a U-shaped member 23 having a base 24 and two integral lugs 25 extending therefrom at an angle to the base. Each of the lugs 25 is provided with an opening 26, the walls of the openings serving as supports for a wrist pin employed to join an eccentric strap 27 to the body 20. The strap 27 includes a head 28 having an opening 29 therein, a shank 30, and a lower portion 31 having an opening 32 therein through which the crank shaft extends.

In assembling the piston shown in Figure 4 the shank 30 of strap 27 is placed between the lugs 25, the opening in the shank 30 being in alignment with the openings 26 in lugs 25. A wrist pin 33 is then forced within the openings attaching the strap 27 to member 23. The U-shaped member 23 is then placed within body 20 in contact with head 21 and is joined to head 21 by induction brazing, welding, or other suitable means.

The fabricated piston of the invention is lighter in weight than pistons heretofore employed. Our piston is provided with an uninterrupted sealing surface by the elimination of wrist pin holes in the wall of the piston skirt, thus eliminating any leakage problem and assisting in compression during operation of a compressor in which our light-weight pistons are employed. If desired, different materials may be employed for the skirt and the head of the piston in the piston illustrated in Figure 1 to secure the most satisfactory combination of wear resistance, strength, and lightness of weight.

While we have described a preferred embodiment of our invention, it will be understood the invention is not limited thereto since it may be otherwise embodied within the scope of the following claims.

We claim:

1. A piston comprising a skirt and a head secured thereto, two spaced lugs depending from the head, each lug being provided with an expansible opening having at least one slit in the margin of said opening.

2. The combination comprising a crankshaft, a piston including a skirt portion and a head portion secured thereto, a strap having one end connected to the crankshaft, and means connecting the other end of the strap to the piston, said last mentioned means including a pair of spaced lugs secured to the head and depending therefrom, each lug being provided with an expansible opening, the margin of which has at least one slit extending toward the edge of the lug, and a wrist pin being yieldably held by lugs.

3. The combination set forth in claim 2 wherein said slit extends to the edge of the lug.

4. A piston comprising a skirt having a cylindrical shape and a head having a disk shape, said head being circumferentially connected to a peripheral edge of an open end of the skirt, wrist pin supporting means connected to the head and having portions depending therefrom, each depending portion being provided with an expansible opening having at least one slit in the margin of said opening for yieldably holding a wrist pin.

5. A piston according to claim 4 in which the head is fabricated of sheet metal and the skirt is fabricated of tubing.

References Cited in the file of this patent

UNITED STATES PATENTS

| Number | Name | Date |
|---|---|---|
| 1,208,338 | Levedahl | Dec. 12, 1916 |
| 1,339,427 | Sykes | May 11, 1920 |
| 1,409,754 | Morgan et al. | Mar. 14, 1922 |
| 1,513,272 | Pourroy | Oct. 28, 1924 |
| 1,600,926 | Briggs | Sept. 21, 1926 |
| 1,940,629 | Mahle | Dec. 19, 1933 |
| 2,040,032 | Steele et al. | May 5, 1936 |
| 2,438,849 | Forster | Mar. 30, 1948 |